United States Patent [19]

Klancnik et al.

[11] 4,324,161

[45] Apr. 13, 1982

[54] AUTOMATIC TURRET LATHE

[75] Inventors: Adolph V. Klancnik, Glenview; Kenneth A. Klancnik, Palatine, both of Ill.

[73] Assignee: Universal Automatic Corporation, Des Plaines, Ill.

[21] Appl. No.: 60,790

[22] Filed: Jul. 25, 1979

[51] Int. Cl.³ .......................... B23B 3/18; B23B 7/04
[52] U.S. Cl. ..................................... 82/2 R; 82/21 B; 82/29 R; 29/27 C; 318/282; 74/813 L; 74/826
[58] Field of Search ............... 82/2 R, 21 B; 29/27 C, 29/64; 318/282, 626

[56] References Cited

U.S. PATENT DOCUMENTS

| | | | |
|---|---|---|---|
| 2,561,346 | 7/1951 | DeVlieg et al. | 318/282 |
| 2,592,920 | 4/1952 | Lovely et al. | 82/21 B |
| 2,656,589 | 10/1953 | Greene et al. | 82/21 B |
| 3,186,062 | 6/1965 | Lange et al. | 29/64 X |
| 3,221,579 | 12/1965 | Tsuda | 82/21 B |
| 3,663,999 | 5/1972 | Catlin | 82/21 B |
| 3,795,853 | 3/1974 | Whitehouse | 318/626 |
| 3,857,079 | 12/1974 | Wake et al. | 318/626 |
| 4,157,231 | 6/1979 | Phillips | 408/13 |

Primary Examiner—Leonidas Vlachos
Attorney, Agent, or Firm—Kinzer, Plyer, Dorn & McEachran

[57] ABSTRACT

An automatic turret lathe in which sequences are manually programmed for automatic control (both turret and cross slide) as an incident to setting up the machine, requiring neither tape nor card programs but rather the manual effort of the machinist; the lathe also incorporates a unique clutch and bearing support for the rotary turret, and the turret has a positive lock for accurately holding the index position; all essential functions and modes including feed rates and r.p.m. are visually displayed.

9 Claims, 20 Drawing Figures

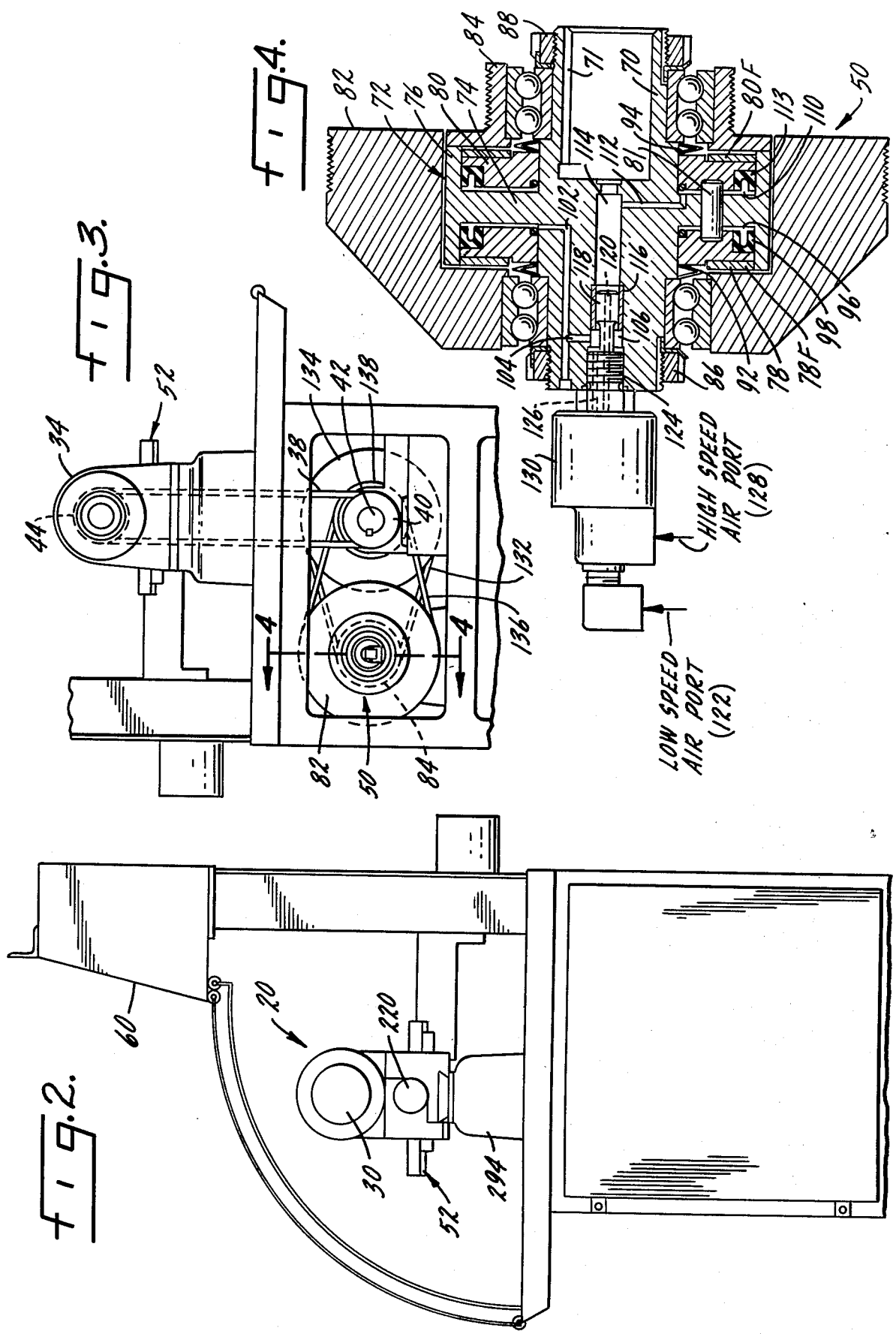

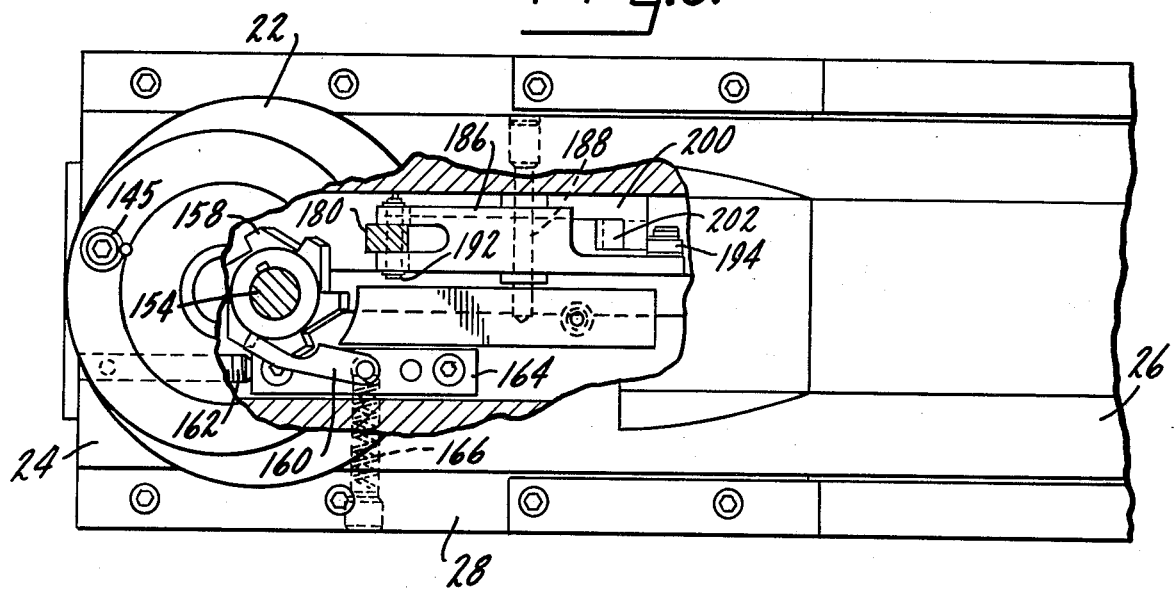
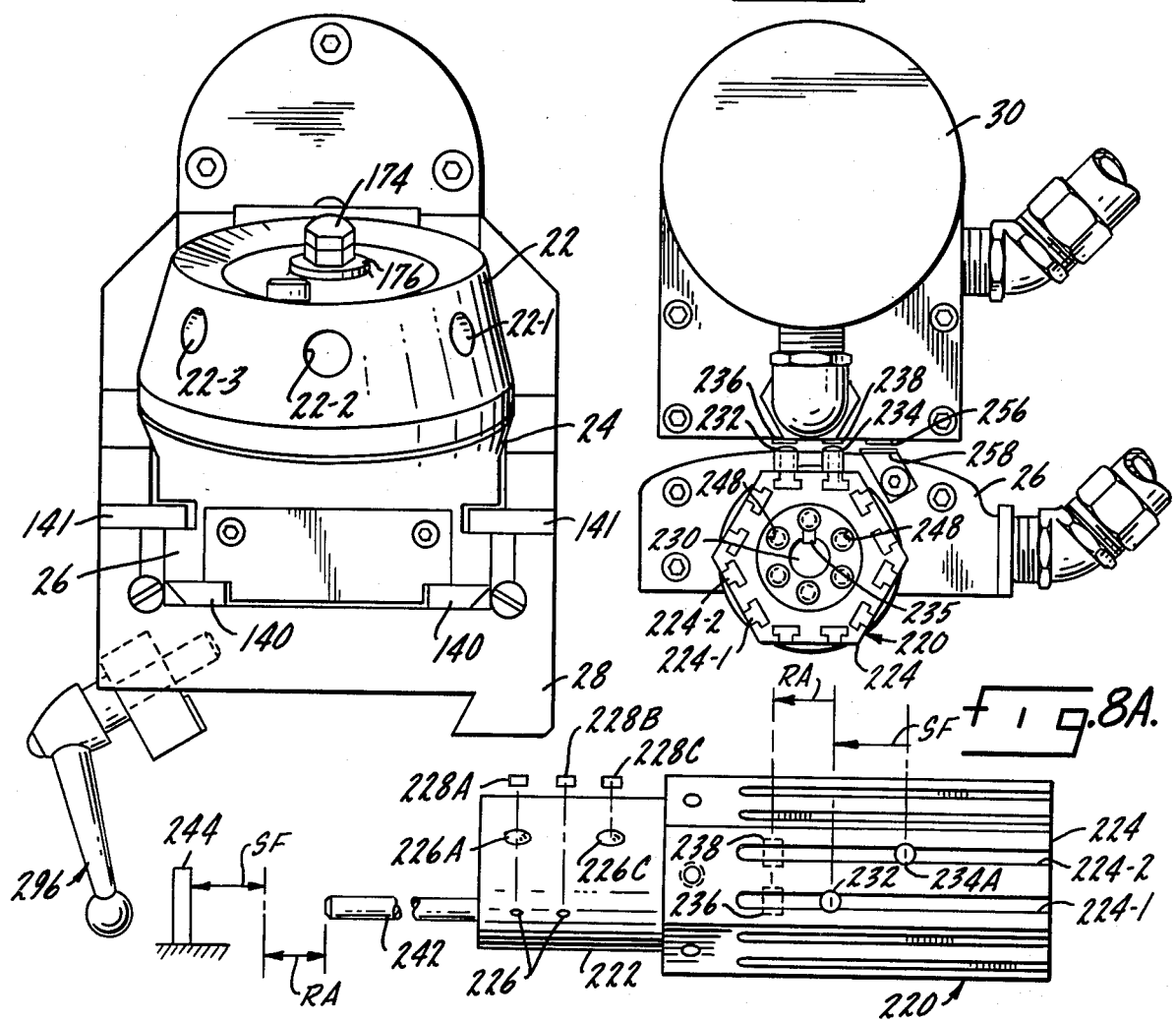

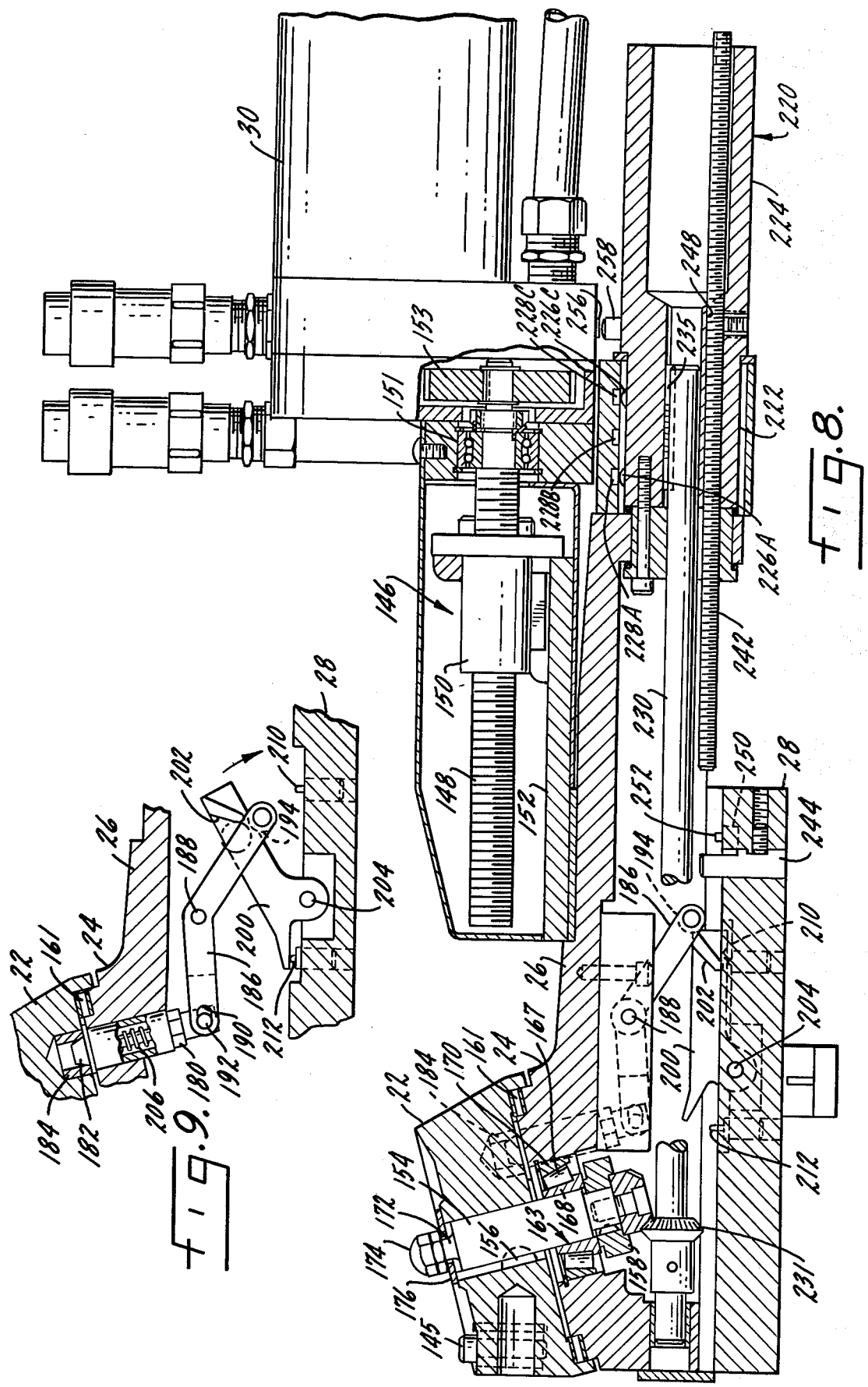

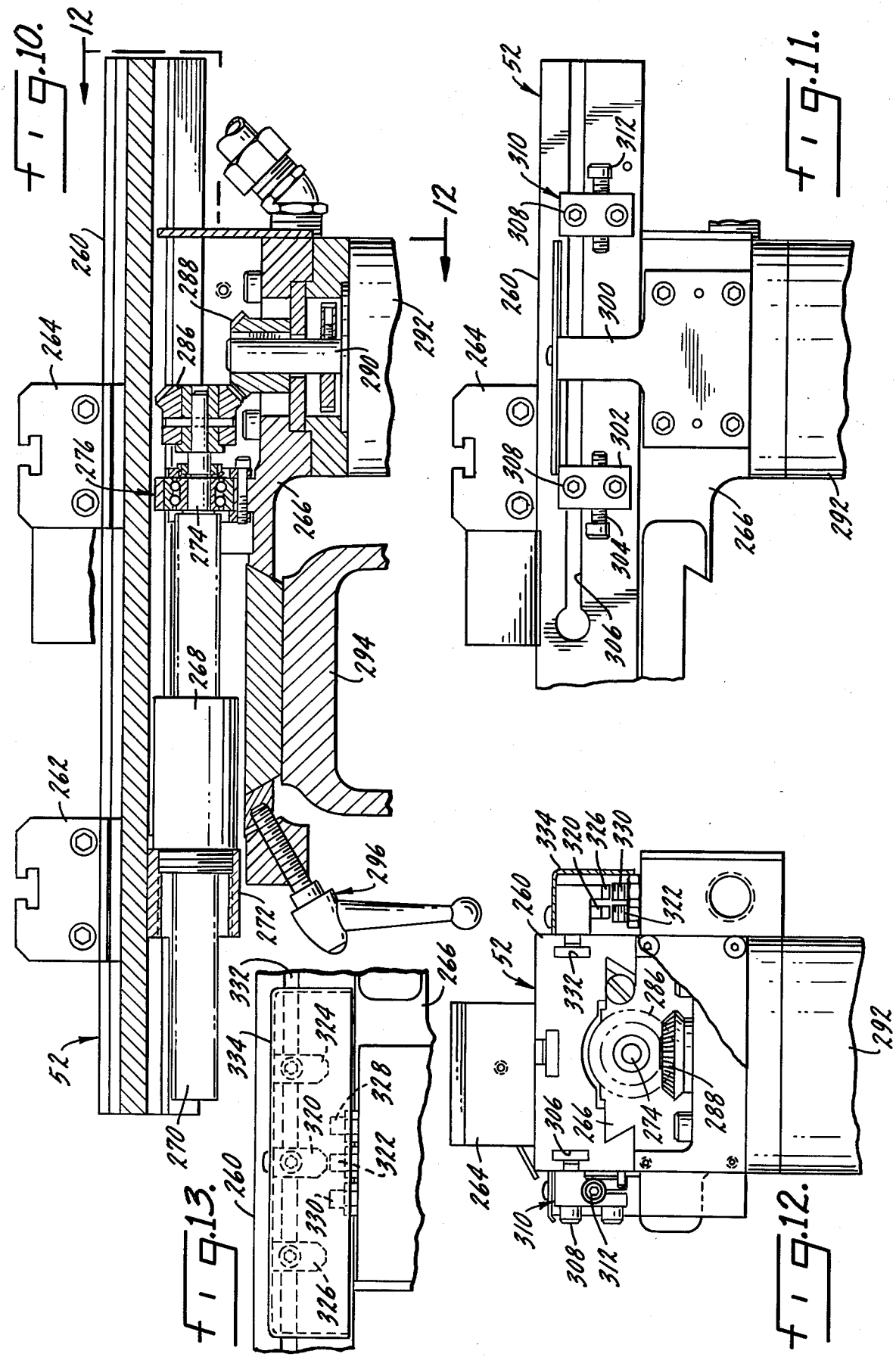

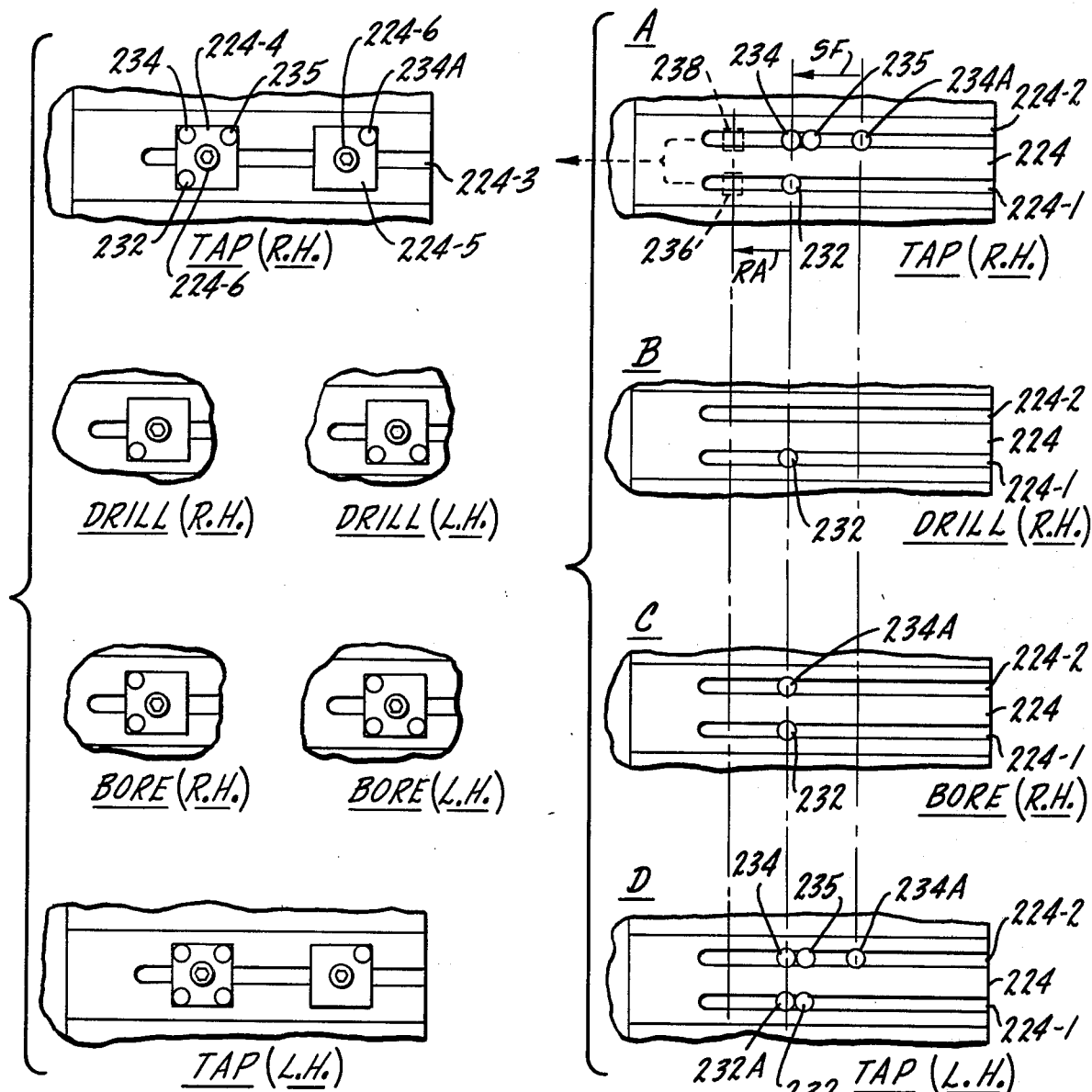
Fig. 19.
Fig. 14.
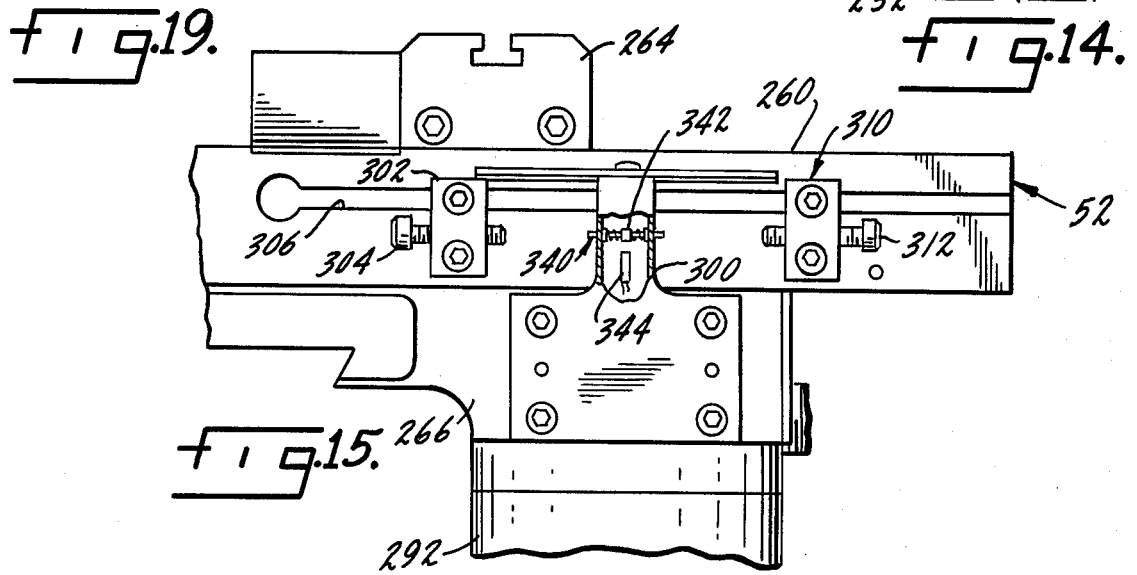
Fig. 15.

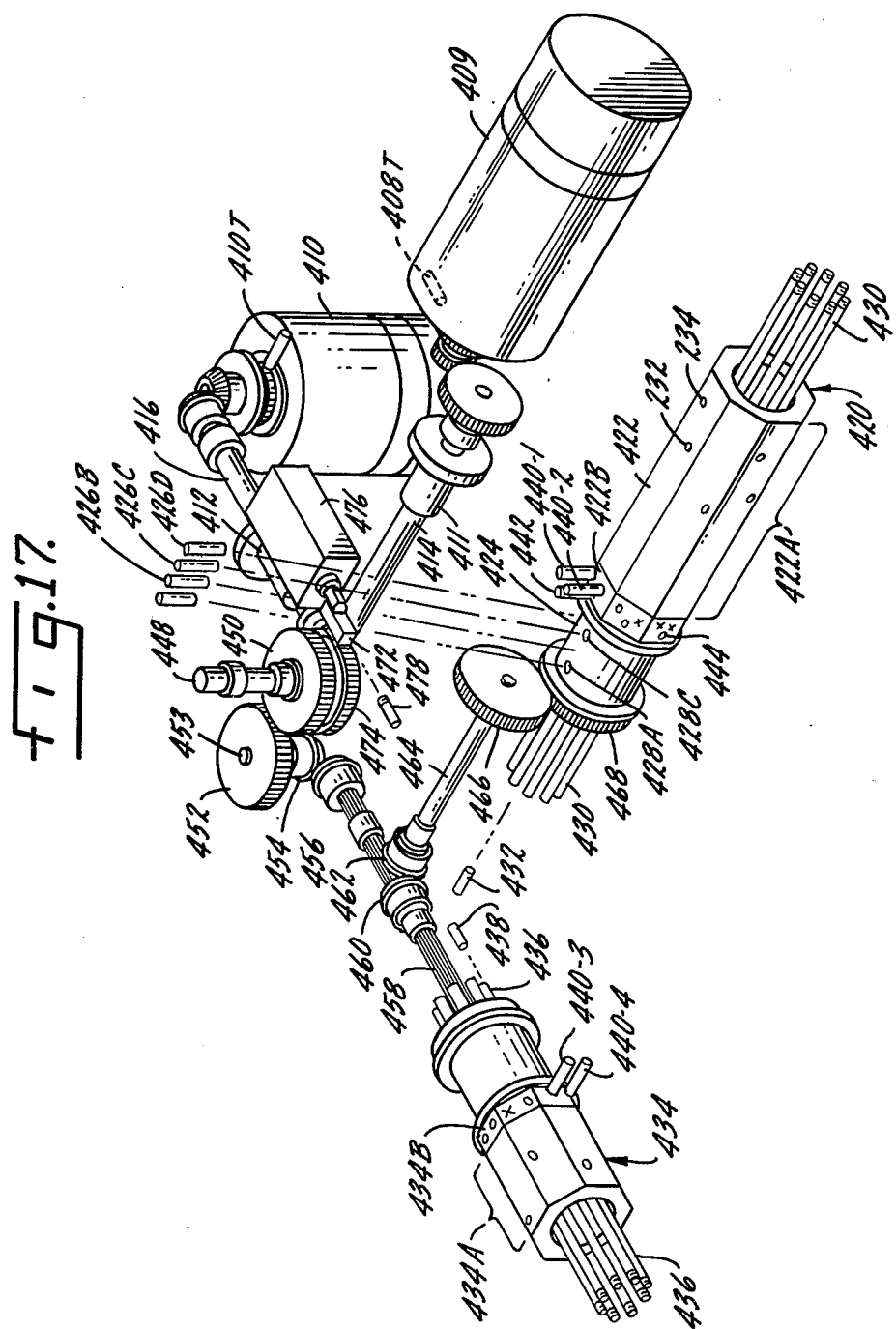

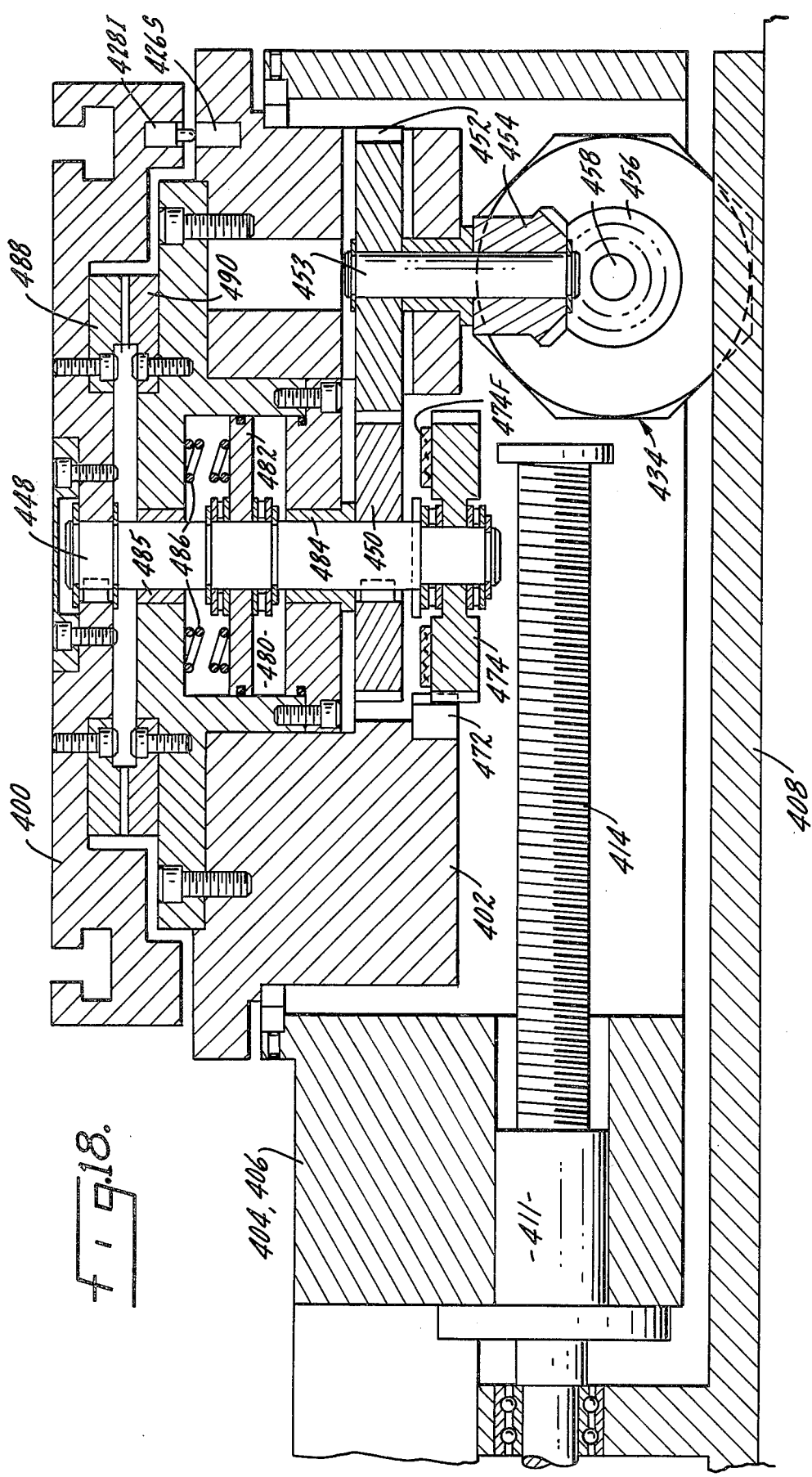

AUTOMATIC TURRET LATHE

This invention relates to an automatic turret lathe.

Lathes of heavy construction are designed with special features that adapt them to large-volume production work. Any number of identical parts can be reproduced accurately and rapidly on these machines.

The setting and adjustment of the cutting tools used on production machines, however, are tasks requiring high skill and, in most cases, considerable time, but once the machines are properly set, the amount of production and the lower unit cost more than offset the initial expense of setting up the job. Furthermore, the gain in production achieved reduces the cost of the equipment over an extended period of operation. The successful development of production machines has contributed in no small way to the interchangeable manufacture of numerous commercial products.

Selection of a particular machine tool for the job to be done will depend upon factors such as the production anticipated and the size and complexity of the product. For this reason, the turret lathe is considered most suitable for producing parts in quantities too small to employ an automatic screw machine. The turret lathe also is suitable for work not within the capacity of an automatic screw machine.

In the modern turret lathe the tailstock is replaced by a turret which may have four, five, six, or more tool positions. The mechanism controlling the rotary movement of the turret is so designed that about its vertical axis. The cutting tools attached to each face of the turret by respective tool holders are successively brought into contact with the work by rotating or indexing the turret.

A turret is incorporated because of a desire to obtain greater production through progressive performance of different machining operations without removing the work from its support, and without changing the tools. The machining operations progressively performed on the machine may include drilling, reaming, tapping, threading, counterboring, countersinking, and other kinds of work. The cutting tools attached to the various faces of the turret, when adjusted, require no change, and thus the rapid machining of any quantity of similar parts is possible with the initial tool setup.

A turret lathe is particularly useful in machining parts out of bar stock held in a collet at the inside diameter of a spindle at the headstock end of the machine. The spindle collet rotates the bar stock and the tools on the turret are presented in succession turning out small symmetrical parts such as studs, pins, and the like. In such instances, a cut-off tool is fed by an auxiliary cross slide located between the headstock and tailstock. The cross slide may also support a tool for turning, grooving, facing, cutting off and so on. There may be both a front and rear cross slide, each having its own tool for performing operations on respective sides of the bar stock. It is possible to engage the workpiece simultaneously by a turret tool and one or more tools on the cross slides.

The turret may be supported on a horizontal, reciprocal slide in turn mated to a fixed, rigid saddle. When the turret has been indexed to the correct position the slide is advanced to present the tool to the work piece; after the operation has been completed the slide is returned and the turret is indexed to the next tool position. The tool, until it encounters the work piece, may advance rapidly and then should revert to slow feed over the working distance while the work piece is engaged. Tool feed must be stopped and the slide reversed when the depth of cut has been achieved. In some instances, when tapping for instance, it is necessary to reverse the spindle (reverse rotation of the work piece) while the tool is being withdrawn by the turret slide.

The foregoing is presented as an introduction to the objectives and novel features of the present invention, concerned with an automatic turret lathe in which one of the objects is to enable the machine to be set up for automatic machine sequence as an incident to setting the machine to turn out the first workpiece and without requiring a programmed tape prepared under the supervision of a skilled programmer. In other words, it is an object of the present invention to enable the skilled machinest or toolmaker, familiar with lathes, to set the machine for automatic operation by himself and indeed to make any subsequent correction without having to depend on someone else responsible for reprogramming a tape. Specifically in this regard is an object of the present invention to enable the machine tool operator or toolmaker himself to set the machine for tool position sequence at the time the tools are selected, and to set the machine for both speed (rapid approach, slow work) and feed (depth of work) at the same time, accomplishing all such settings merely by positioning discrete mechanical indicia carried by a shaft or an equivalent which reciprocates with the turret slide and which can be indexed as an incident to indexing the turret. A related object of the present invention is to enable the turret slide to be reversed after the desired depth of work has been completed (a tap or drill for example) merely by setting a stop, one for each tool position, so that the motor which reciprocates the turret slide may be reversed as a result of an increase in current when the turret is thus brought to a stop. This feature of the machine, again, is attained without indulging the services of a trained tape programmer.

Various means have heretofore been proposed for varying the speed range and torque of the spindle and in accordance with the present invention, as another object, a simplified air-operated clutch is employed to change from high speed low torque to low speed high torque.

To assure rigidity of the turret and to assure precision in the tool position represent further objects of the present invention, respectively achieved by a unique bearing mount and support for the turret, and a pin which accurately holds the turret position.

IN THE DRAWING

FIG. 2 is an end elevation as viewed on line 2—2 of the machine shown in FIG. 1;

FIG. 3 is a detail elevation of the clutch for the spindle of the machine;

FIG. 4 is a sectional view, on an enlarged scale, taken on the line 4—4 of FIG. 3;

FIG. 5 is a detail end elevation view of the turret and turret slide assembly;

FIG. 6 is a top plan view of the turret and turret slide assembly, partly broken away to show the turret indexer;

FIG. 7 is an elevational view of the turret and turret slide assembly at the end opposite that shown in FIG. 5;

FIG. 8 is a longitudinal sectional view of the turret and turret slide assembly;

FIG. 8A is a fragmented detail of the memory unit and depth-of-cut stop;

FIG. 9 is a detail view of the turret lock;

FIG. 10 is a side elevation of the cross slide assembly, partly in section, taken on the line 10—10 of FIG. 1;

FIG. 11 is a detail elevation of the cross slide assembly on the same side as that shown in FIG. 10;

FIG. 12 is an end elevation of the cross slide assembly, partly broken away, taken on the line 12—12 of FIG. 10;

FIG. 13 is a detail elevation of a control for the cross slide;

FIG. 14 is a schematic view showing different modes of operation;

FIG. 15 is a detail view of parts associated with the cross slide;

FIG. 17 is a perspective of compound turret parts;

FIG. 18 is a sectional view of the compound turret.

FIG. 19 is a schematic view similar to FIG. 14 showing a different coding arrangement.

GENERAL DESCRIPTION

Figure 1:
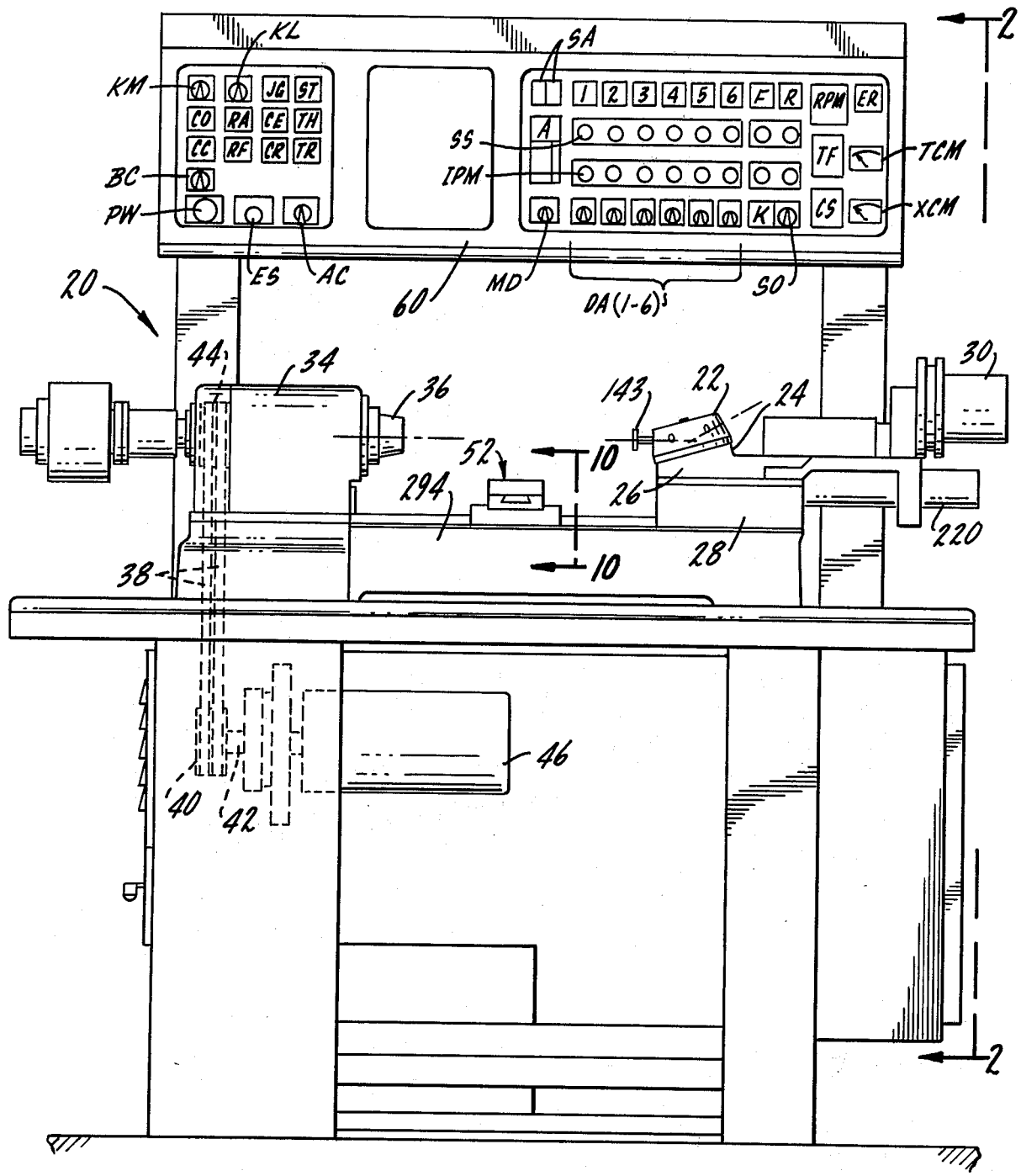
FIG. 1 is a front elevation of an automatic turret lathe constructed in accordance with the present invention.

The turret lathe 20, FIG. 1, has a turret 22 supported for rotary indexing movement on the head 24 of a slide 26 which is dove-tailed to a stationary saddle 28 at the tailstock end of the machine.

The slide 24 is reciprocated by a reversible multi-speed D.C. motor 30, which, for reasons to be explained, is self-reversing in response to a change in current.

At the headstock end of the machine, FIG. 1, there is a spindle housing 34 from which the spindle 36 projects. The spindle 36 includes, on the inside, a collet (not shown) adapted to grip a long piece of bar stock of which a measured section represents the workpiece to be machined by a tool on the turret.

The spindle, and hence the bar stock material, is rotated by a pair of belts 38 which transmit power from a pulley assembly 40 on a jack shaft 42 to the driven pulley assembly 44 secured to the spindle. Power for driving the spindle is derived from a multi-speed reversible D.C. motor 46, power being transmitted to the jack shaft 42 through a clutch 50, FIG. 4. To maintain consistent rpm during changes in spindle load due to cutting, the voltage and amperage for the motor 46 will be varied accordingly by a motor control, not shown.

A cross slide 52 is positioned between the headstock and tailstock and incorporates a front and back tool as will be explained in more detail below.

A control panel 60 is supported above the headstock and tailstock.

As mentioned above, the workpiece is rotated by the spindle and power is delivered to the spindle from the motor 46. The clutch 50, interposed between the motor 46 and the jack shaft 42, plays an important role in the operation of the machine and will now be described in detail.

The Clutch: FIGS. 3 and 4

The clutch includes a large shaft 70, FIG. 4 adapted to be keyed at 71 to the shaft of motor 46 so as to be rotated thereby. The clutch shaft includes a flywheel 72 having a flat plate or disc portion 74 and a rim or flange 76 which is annular.

Positioned on opposite sides of the flywheel plate 74 are a pair of clutch pressure plates 78 and 80. A dowel 81 joins the two clutch pressure plates to the flywheel. The pressure plates 78 and 80 are free to move axially on the shaft 70 on which they are mounted.

Each of the pressure plates has a friction facing 78F and 80F engageable with but normally spaced from the opposed surface of a high-speed drive pulley 82 and a low-speed drive pulley 84, respectively. The pulleys, as shown in FIG. 4, are supported by ball bearing races concentrically on the shaft 70. The shaft 70 is threaded at the opposite ends to receive retainers 86 and 88 which lock the bearings in place and secure the pulleys for rotation independently of one another.

The pressure plates are urged away from the surfaces of the pulleys they are adapted to engage and such urging is accomplished by springs 92 and 94 interposed between the ball bearing races and the respective pressure plates. Thus, the pressure plates are normally spring urged away from engagement with the pulleys with which they are related so that each pressure plate is normally disengaged from the related pulley, but if a pressure plate is actuated to engage a pulley then it will transmit torque from the driven clutch shaft 70 to the related pulley and in turn rotary motion will be imparted to the jack shaft 42.

To enable pressure plate 78 to be moved to the left as viewed in FIG. 4, to engage the high-speed pulley 82, an air chamber 96 is defined between the pressure plate 78 and the opposed surface of plate 74 and this air chamber is enlarged by an annular elastomeric piston insert 98 tightly fitted in an annular recess in the rear face of the pressure plate 78 which is opposed to the hub plate 74.

Air for actuating pressure plate 78 is communicated to chamber 96 by a long air passage 102 which extends axially of the shaft 70. Air passage 102 in turn communicates with a short cross passage 104 which in turn communicates with an internal chamber 106 in shaft 70.

Air for actuating pressure plate 80 is communicated to a chamber 110 behind pressure plate 80 through a cross passage 112 in the clutch shaft which communicates with a chamber 114 in shaft 70 isolated from chamber 106. Pressure plate 80 is equipped with an annular piston 113 communicating with chamber 110. The chambers 106 and 114 are isolated by a bearing 116 which engages a shaft 118 having an air passage 120 therethrough. Air passage 120 communicates at one end with chamber 114 and at the opposite end communicates with low speed air port 122.

A coupling 124 surrounds shaft 118 and is secured to the clutch shaft. Coupling 124 has an air passage 126 communicating with chamber 106 at one end, and at the opposite end communicates with a high speed air port at 128 presented by a union 130.

Hence, by admitting air under pressure to passage 126, pressure plate 78 will be actuated in opposition to spring 92 to engage its friction face 78F with the opposed surface of the high-speed pulley.

It can also be seen in FIG. 4 that the pressure plate 80 is also associated with an air chamber and piston enabling the pressure plate 80 to be actuated against the return action of the spring 94 and this is accomplished by admitting air to the low speed port which port communicates with passage 120.

As shown in FIG. 3, the low-speed pulley 84 is connected by a belt 132 to a large pulley 134 84 is connected by a belt 132 to a large pulley 134 secured to the jack shaft 42 and on the other hand, the high-speed pulley 82 is connected by a belt 136 to a smaller pulley 138 secured to the jack shaft 42.

A solenoid valve (not shown) may be controlled in response to speed to apply air under pressure either to the low-speed port 122 or the high-speed port 128, causing the clutch to shift.

Turret Support, Turret Indexing, and Turret Lock

As mentioned above, the turret 22, FIG. 5, is carried by a slide 26 for advance and return movement relative to the spindle housing. The slide 26 is guided by a plurality of wear plates 140 and 141 which are affixed to the saddle 28.

The turret has different tool positions defined by openings as 22-1, 22-2 and 22-3, FIG. 5, of which there may be six in number. In FIG. 1, a stop 143 may be secured in one of the tool positions for reasons to be explained. Each tool is secured to the turret by a locking mechanism 145, FIG. 8.

The slide 26 is reciprocated by a ball screw assembly 146, FIG. 8, including a screw 148 rotating within a ball nut 150. The nut 150 is secured to a mounting plate 152 which in turn is secured to the slide 26. Thus, by rotating the screw in the appropriate direction nut 150 may be advanced or retracted accordingly to advance the slide and turret or return the slide and turret to home position.

The screw 148 is turned by a gear 153 secured to the end of the screw 148 opposite the turret 22. Gear 153 is meshed with a driving gear (not shown) driven by the shaft of motor 30. The screw shaft 148 is rotatably supported by a ball bearing 151.

The turret 22 is secured for rotation to a turret indexing shaft 154 which is on a tilted axis as will be evident in FIG. 8. The turret is keyed to shaft 154 by a key 156 such that by indexing shaft 154 about its axis the turret will be turned through a corresponding arc.

To index the turret, the indexing shaft 154 is provided at its lower end with a ratchet 158, FIGS. 6 and 8, operated by a pawl as will now be explained.

Indexing of the turret takes place during return movement of the slide, as it moves into home position to the right as viewed in FIG. 8. The turret is freed for indexing movement during return motion of the slide in a manner to be explained and in the course of return movement the ratchet 158 encounters an interference one-way pawl 160, FIG. 6, the arrangement being such that the turret is stepped by the pawl through an arc corresponding to the angular separation between tool positions as 22-1 and 22-2, FIG. 5.

To afford a positive stop for the turret and slide in the home position, the slide carries a long set screw 162, FIG. 6, adapted to engage a pawl block 164 which is secured in fixed position to the saddle 28. The block 164 also serves as a pivotal support for the shaft of pawl 160, said shaft having a flat surface biased by a spring-in-plunger assembly 166 as is well known, which allows the pawl 160 to swing free of the ratchet 158 when the turret slide is actuated for tool approach movement.

During indexing movement, the turret rotates relative to a support head 24, FIG. 8, which is part of the slide 26. A needle thrust bearing including needle bearings 161 captured between races in the turret and slide head is interposed between the slide head 24 and the turret 22, permissive of smooth transition of the turret 22 during indexing movement. The needle thrust bearing also absorbs some of the thrust imposed on the turret when the tool is working.

To enable the turret to hold the index position for accurate machining and to impose a pre-load on the turret bearings so that the turret will not miss the index position to which it is turned by the ratchet, a taper bearing 163 is arranged in supporting relation to the index shaft 154 as shown in FIG. 8. Thus, a plurality of tapered roller bearings 167 are captured between complementally configured sloped races 168 and 170 associated respectively with the slide head 24 and the index shaft 154.

The index shaft 154 includes a threaded stud 172 at the upper end supporting a lock nut assembly 174. A washer 176 is interposed between the lock nuts 174 and the upper surface of the turret 22 such that by tightening the lock nuts 174 the taper bearing 163 will impose more resistance on shaft 154, that is, by tightening the lock nut, shaft 154 is pulled upwardly (in compression) as viewed in FIG. 8 so that ratchet 158 exerts more thrust on the taper bearing resulting in more resistance to rotary indexing motion of the turret when the indexing force is applied by the pawl to the index ratchet. The thrust bearing 161 is preloaded at the same time.

The index position is held by a lock pin or plunger 180, FIG. 9, having an upper, tapered end 182 adapted to wedgingly engage a tapered bushing 184 carried by the turret, there being a tapered bushing 184 for each index position of the turret.

The lock pin 180 is thrust into or removed from the related index bushing 184 by an actuating bell crank lever 186 pivotally mounted at 188 in the turret slide. The bell crank 186 at one end is provided with an elongated slot 190 in which is captured a stud 192 carried at the lower end of the lock pin 180. The opposite end of the bell crank carries a cam follower roller 194 which is related to a cam surface on a trip dog 200 supported within the saddle 28.

Thus, the trip dog 200 is provided with a cam track 202 at the rear end as viewed in FIG. 8 and is pivoted at 204 near the opposite end. The trip dog 200 is free to pivot in the counter-clockwise direction as viewed in FIG. 8 but cannot pivot in the clockwise direction.

In the home position of the slide and turret, roller 194 is at the rear of cam track 202 and when the slide is reciprocated in the approach direction, to the left as viewed in FIG. 8, roller 194 engages the under side of the cam track and lifts the dog 200 as shown in FIG. 9. At this time, the lock pin 180 is firmly held in the turret locking position by a strong coil spring 206 (or equivalent spring bias) so that during tool approach and especially during tool feed the turret is held rigidly in the indexed position by a press fit of the pin in the bushing as 184.

During tool approach, roller 194 eventually passes the cam track 202 and the trip dog 200 falls back to normal position shown in FIG. 8. A pair of small spring biased plungers 210 and 212 are engageable with the underside of the trip dog 200 to prevent the latter from hanging up in any position.

During turret return the roller 194 eventually engages the upper side of the cam track 202 as viewed in FIG. 8 which imparts counter-clockwise motion to the actuating lever 186 so that the tapered end 182 of the index lock pin or plunger commences to withdraw against the return action of spring 206. Just as the roller 194 attains the top of the cam track 202 the lock plunger is fully withdrawn, allowing the ratchet pawl to index the turret to the next position which is completed just as the roller 194 starts to drop off the rear end of the cam track 202, which is to say that after the ratchet has been actuated by its pawl to index the turret, plunger 182 is returned by spring 206 to the locking position.

By adjusting the pre-load on the thrust bearing 161 and taper bearing 163, sufficient resistance can be imposed to insure that rapid angular momentum caused by rotary inertia of the tool assembly does not cause the turret to over-travel beyond the correct index position.

Automatic Programming of the Turret as an Incident to Setting Up the Machine

It has been mentioned above that one of the objects of the invention is to enable the machine to be set up for automatic operation as an incident to setting up the machine on the first workpiece. Some programming in this regard involves manual setting accomplished by the machinist or the toolmaker. This includes denoting the tool position of the turret, setting the machine for rapid approach of the turret slide until the tool feed position is attained, setting the depth of cut or feed and setting the machine for reverse spindle motion when the workpiece is to be cut with a thread.

Similar settings are made at the cross slide, and settings are made on the control panel, as will be explained.

To set the machine for tool position, position one, position two, position three and so on, enabling the operator to look at the control panel to observe tool sequence, the machine is provided with a memory unit which stores, mechanically, a digital equivalent of the turret position.

To enable certain performances on the first workpiece to be repeated for the full production requirement, the machine is equipped with an automatic sequencer unit which stores, mechanically, a digital equivalent of certain work done on the first workpiece.

Advantageously, both the memory unit and the digital sequencer unit are combined in one mechanical unit which carries selectively positionable indicia to which sensors are responsive for indicating tool position and denoting the different modes of movement of the turret slide for the related tool position.

Specifically, the memory unit for tool position is rotated accordingly as the turret is indexed and the sequencer for automatic tool performance is an exact replica of the reciprocal motion of the turret slide.

When the turret is indexed, both the memory unit and the sequencer are indexed as an incident and are indexed to fixed sensors for sensing the turret tool position and the feed modes of the turret slide.

Referring to FIG. 8, a drum 220 is connected to the rear of slide 26 to reciprocate therewith. The drum 220 includes a collar 222 constituting the tool position memory unit and a six-sided barrel 224 constituting the automatic sequencer.

As best shown in FIG. 8-A, the collar 222 is provided with openings as 226 constituting code mounts which are assigned to index positions on the circumference of the collar corresponding to the tool index positions of the turret. There are two such openings at each circumerential position but the openings are at different axial positions, so that there may be an opening 226 aligned axially with a turret position indicator sensor 228A, 228B or 228C.

The openings 226 in the memory collar are adapted to receive code indicium in the form of metallic studs, and in FIGS. 8 and 8A two such studs are shown at 226A and 226C, denoting digitally a corresponding tool position of the turret which can be sensed by related sensors 228A and 228C when the turret has been indexed to present the studs in proximity to the sensors corresponding thereto.

All other positions of the turret will be indicated in a similar manner by one or two studs which, combined with the three possible axial positions on the collar, are sufficient to encode six turret positions accordingly.

The memory collar 222 is turned as an incident to indexing the turret 22 and this is accomplished by a memory index shaft 230. The index shaft adjacent the left hand end as viewed in FIG. 8 is provided with a bevel gear 231 meshed with a bevel gear 233 carried at the lower end of the turret index shaft 154. The opposite end of the memory index shaft 230 is connected to drum 220 by a key 235 and by this arrangement the memory sequencer drum 220 will be rotated as an incident to indexing the turret 22.

The sensors responsive to the tool position indicia are known proximity switch oscillators which radiate a sensing field. When a metallic stud as 226A enters the sensing field, eddy currents are induced which changes the internal impedance of the oscillator, resulting in a signal output from the oscillator circuit. The signal may also be flashed to control panel indicators to display digitally the tool position. The sensors described hereinafter operate on a similar principle.

The sequencer segment 224 of the drum 220 is provided, on each of its six sides, with two tracks 224-1 and 224-2, FIG. 8A. Track 224-1 is adapted to receive a metal stud 232 which is to denote the limit of rapid approach for the turret slide. Thus, the variable speed, reversible motor 30 which turns the feed screw 148 to advance and retract the turret slide normally operates at high speed but such high speed approach is to be terminated when the tool engages the workpiece to commence the tool feed mode.

The stud 232 is associated with a speed mode control sensor 236, FIG. 8A. Stud 232, during tool set up, will be displaced by the machinist from sensor 236 by a distance corresponding exactly to the limit of rapid approach. This is indicated by the symbol RA, FIG. 8A.

The second track 224-2 is adapted to receive a stud as 234A related to a control sensor 238 for denoting certain controls which are to prevail for internal tapping as will be explained.

The tracks as 224-1 are T-shaped, FIG. 7, and the shanks of the studs can be slid therein by the machinist during set up. The studs are actually metal caps threaded on the shanks so that by loosening, positioning and then tightening, the studs can be set in the precise position.

As will be explained in more detail below, the drum 220 may carry at each tool position, a long screw 242 adapted to engage a fixed stop 244, FIG. 8, at the termination of tool feed (drill or bore) and of course by "tool feed" is meant the depth of work performed on the workpiece following engagement of the tool with the workpiece.

Sequencing can be introduced by the showing in FIG. 8A, using an internal tap as an example. The turret slide undergoes rapid approach, rapidly approaching the workpiece, until indicium 232 is aligned with and thereby detected by sensor 236, whereupon sensor 236 actuates a control which imposes slow feed speed on motor 30. Now, the tapping tool engages the workpiece (being rotated by the spindle) and slow feed prevails over distance SF until the tap has been completed. The spindle is reversed and the turret slide motor is reversed (as will be explained in more detail) and at the same time sensor 238 detects the presence of stud 234A aligned therewith, originating a control which causes the turret slide motor to return the turret at the slow rate over distance SF so that the tapping tool may be withdrawn at the slow rate during return movement of the turret slide.

For drilling and boring the end of tool feed is precisely denoted by the end of the stop screw 242 engaging the stop 244 at the end of slow feed, denoted by the symbol SF in FIG. 8A.

There is a similar stop screw as 242 for each tool position. Referring to FIG. 7, these stop screws are threadedly mounted in respective openings 248 in the drum 220 to extend axially thereof and hence, like the sensor-related studs, can be positioned at will by the machinist. Consequently, the termination of (drill or bore) depth of cut or tool feed for each tool position is determined by engagement of the stops 242-244.

When the stops 242-244 engage during drilling or boring, the current to the motor 30 instantly rises and this rise in current is detected by a motor control which instantly reverses the motor 30, returning the turret slide to home position, regardless of anything else. Return of the turret slide is always at the rapid rate, unless the requirement is otherwise, as in the instance of tapping as will be explained.

When the tool operation is tapping, under control of stud 234, return of the turret slide over the distance SF, FIG. 8A, during reverse spindle motion, is at the slow rate until stud 232 is returned to sensor 236, meaning the tapping tool is fully withdrawn from the workpiece, whereupon the slide is returned to home position at the rapid rate. This sequence is not required when there is a tool cutting the outside of the workpiece, so that turret slide return throughout the whole distance may then be at the rapid rate.

Thus, when the work on the workpiece is external (boxing, turning, and so on) only one stud (232) on the sequencer is controlling, allowing rapid approach until the work is started, imposing slow feed during working and allowing rapid return over both distances SF and RA. This is equally true of drilling. Reverse spindle motion is not required when the work is other than tapping.

On the other hand, for tapping, the sequence is: rapid approach over distance RA, slow feed over distance SF, reverse spindle, slow return over distance SF and then rapid return over distance RA.

To counter the possibility of failure to set a stud 232 denoting the end of rapid approach, a safety switch 250 having a trip 252 is located in the path of screw 242, a small fraction of an inch in front of the fixed stop 244. If this switch is tripped without the sensor 236 being activated, meaning rapid approach prevails when there should be slow feed, switch 250 itself then actuates a control to impose an emergency stop on the turret slide to prevent screw 242 engaging stop 244 at the rapid approach rate.

To decelerate the turret slide as it nears home position when returning at the rapid (return) rate, a motor control sensor 256 FIG. 8, is located at the underside of the support for motor 30. A proximity indicium 258, for altering the sensing field of the sensor, like the others, is secured to the turret slide and when this indicium is presented to sensor 256 a control signal is established which powers motor 30 to zero as stop screw 162, FIG. 6, engages the adjacent end of pawl block 164.

The Cross Slide

The cross slide has been earlier denoted by reference character 52 in FIGS. 1 and 2. The cross slide is shown in more detail in FIGS. 10, 11, 12 and 13.

The cross slide includes a slide 260 on which is mounted a front tool support 262 and a rear tool support 264. The tools to be supported may be knurling tools, both front and back, a turning tool, a tool for cutting a circumferential groove, and almost invariably a cutoff tool for separating the finished workpiece from the bar stock fed by the spindle.

The slide 260 is dove-tailed for reciprocal movement on a saddle 266, FIG. 12, and, as in the instance of the turret slide, carries a ball nut 268, FIG. 10, driven by a feed screw 270, the nut 268 being fixed to the slide 260 by a retainer 272 so that rotary motion of the feed screw 270 is transmitted to the slide 266. The feed screw 270 has a reduced portion 274 rotatably supported in a bearing 276 fixed to the saddle 266. The reduced end portion of the feed screw carries a bevel gear 286 which is meshed with a driving bevel gear 288. The driving gear is keyed to the shaft 290 of a variable speed, reversible D.C. motor generally indicated by the motor housing 292, FIG. 10.

The saddle 266 is supported by a bed 294. The saddle 266 may itself be moved to an adjusted position on the bed 294, the adjusted position being held by a hand-operated clamp assembly 296. As will be evident from FIG. 5, the saddle 28 which supports the turret slide may also be shifted on the bed 294 to an adjusted position held by a similar clamp.

The depth of cut by the front tool is limited by a stop, and this is equally true for the depth of cut by the back tool. Thus, as shown in FIG. 11, a stop post 300 is fixed to the cross slide saddle. The cross slide carries a stop block 302 for the front slide in which a stop screw 304 is mounted. The block 302 is captured in a track 306 in the cross slide and by means of a screw 308 can undergo a coarse adjustment relative to the stop post 300. The screw 304, on the other hand, is set for fine adjustment of the stop position.

An identical adjustable, coarse stop block 310 and screw 312 are slidable in slot 306 to enable fine positioning to be achieved for the back tool 264.

When either stop screw 304 or 312, as the case may be, strikes stop 300, there is a rise in the current supplied to the cross slide drive motor. This rise in current is sensed by a sensor which activates a switch (not shown) which reverses the cross slide drive motor, returning the cross slide to home (center) position at a rapid return rate.

The center (home) position of cross slide 260 is shown in FIG. 13. This position is denoted by an indicium 320, adjustably supported on the slide 260, and opposed to a relatively fixed sensor 322. The extent of cross feed for the two tool supports 262 and 264 is controlled by indicia 324 and 326, adjustably mounted on the cross slide in slot 232 and respectively related to sensors 328 and 330.

The cross slide control indicia are effective to control the cross slide drive motor in the same manner as the indicia described in connection with FIG. 8A; they are protected by a cover plate 334.

Thus, the cross slide will be activated at rapid approach in nearly all instances until an indicium 324 or 326 is aligned with its sensor. This juxtapositioning denotes the cross slide tool is in position to work, whereupon the cross slide motor advances the cross slide at the feed rate until a stop screw 304 or 312 engages the stop 300, denoting the end of the work cycle and causing reversal of the cross slide drive motor on the same principle described above.

It has also been mentioned above that switch actuator 252, FIG. 8, when engaged by the nose of the stop screw 242 prescribes bringing the turret slide to an emergency stop if there was failure to set a stud to denote the end of rapid approach and to prescribe commencement of tool feed.

The same function may be used for the cross slide, FIG. 15, although in slightly different mechanical form. A spring plunger 340 is set in the post 300, FIG. 15, and supports a slide-centered indicium 342 normally on the axis of the field of a proximity sensor 344 which denotes the centered or home position of the cross slide. If the indicium 342 is displaced from the field of sensor 344, as it will be when the the stop 304 or 312 engages therewith near the end of the cut by the cross slide tool, and if there was no indicium (324 or 326) previously set by the machine operator to prescribe commencement of slow feed for the cross slide (an error), this lack of an AND signal (at the microprocessor) results in an emergency stop of the cross slide motor to prevent a crash against the stop post 300 at the rapid approach rate. A similar plunger may be presented to the stop screw 242 rather than the set-up shown in FIG. 8.

Machine Modes; Other Settings

FIG. 14 charts typical conditions for programming by means of studs in the sequencer unit.

Condition A, FIG. 14 is an enlargement on what is shown in FIG. 8A. The turret slide advances at the rapid feed rate over distance RA until stud 232 alters the sensing field of sensor 236, denoting that the tool is in position to cut, whereupon the turret slide advances at the slower feed rate over the working (cutting) distance SF, which may correspond to a tapping operation.

When sensor 236 detects stud 232, sensor 238 also senses, sequentially, studs 234 and 235, signifying to the microprocessor that after the tap has been completed the drive motors for the spindle and turret slide are to be reversed. Thus, by two pulses derived from studs 234 and 235 the microprocessor is informed of a "tapping mode" and to expect a third signal as will now be explained.

At the end of the slow feed distance SF corresponding to the depth of cut, stud 243A is sensed by sensor 238. This constitutes the third signal mentioned above, terminating the tap, causing reversal of the motors and prescribing (for the microprocessor control) that the turret slide return at the slow rate, during tool withdrawal, which rate prevails until stud 232 re-attains the sensing field axis of sensor 236; thereafter the turret slide returns toward home position at the normal, rapid rate. Condition "A" is a right hand tap: rapid approach, slow feed in, reverse spindle, slow feed out, rapid return.

Slide return, under the general rule, is always at the rapid rate over the whole return distance, after the work is completed, unless excepted by a stud in track 224-2.

Thus the general rule for normal performance is depicted at B in FIG. 14. There is no stud in track 224-2 and the tool may be a mere drill. The drill approaches at the rapid rate until the work is to be commenced (stud 232 aligned with sensor 236; sensor 238 unaffected) whereat slow feed occurs over the working distance as the drill completes its cut. When the turret slide reverses due to screw 242 engaging its stop, the drill is withdrawn over the entire distance at the rapid rate since there is no stud in track 224-2 prescribing a different mode.

Condition C is nearly the same as condition B, except it is assumed the tool is a boring tool, boring "in" and boring "out" (both at the slow rate) since the boring tool works in both directions inside the workpiece. However, reverse spindle motion is not required when boring out so there is no need for a stud which is used to prescribe reversal of the spindle drive motor as when tapping.

Condition D is for a left hand tap, meaning the spindle must be turning in the opposite direction at the time of tool entry compared to condition A for a right hand tap. Thus, stud 232A in slot 224-1 prescribes that the spindle is to reverse at the commencement of feed. Thus, in the instance of a left hand tap, sensor 236 receives two pulses, one after the other, at the end of rapid approach, and at the same time sensor 238 receives two pulses, one right after the other, at the commencement of feed, just as in condition A. For the left hand tap, then, the sequence is: rapid approach, reverse spindle, slow feeding, reverse spindle, slow feed out, rapid return.

It is beyond the scope of this disclosure to involve the microprocessor, (MOS chip) configuration and logic architecture. The essential requirement is that there be accomodation for sensing the indicia which linearly denote the end of rapid advance (RA) and prescribe the commencement of slow feed (SF), which may prescribe continuation of the slow rate for the turret slide during tool withdrawal under tapping and boring conditions, and which may prescribe spindle reversal.

In the instance of a left hand drill or left hand bore, there will be a second stud track 224-1 prescribing reverse spindle motion at the commencement of slow feed, just as in the instance of a left hand tap. It will also be recognized that drilling and boring involve the stop screw 242 which acts in a positive manner to set the depth of cut with great precision. Such precision is not required for a tap; in tapping the location of stud 234A sets the depth of cut.

In like manner, another advantageous requirement is that there be an indicium 258 on the turret slide, and related sensor 256, for prescribing interruption of power to the turret slide motor when the turret slide nears home position during the return stroke. In this same connection, it will be recalled engagement of stop 242 with stop 244 prescribes reversal of the slide motor to commence tool withdrawal.

There are three main modes of operation: (1) Hand Load; (2) Bar Stock; (3) Magazine Feed. In Hand Load, a collet-chuck is mounted on the spindle 36 to receive hand-loaded individual workpieces; in Bar Stock, the workpiece is a stock bar fed step-wise at the spindle; in Magazine Feed, a collet is loaded sequentially with workpieces fed from a supply magazine and each workpiece is pushed into the collet by the first tool on the turret, whereafter the turret slide returns to home position for the subsequent indexed tooling.

(1) Hand Load—or Chucking Operation:
 a. Cross Feed Only—front tool only—rear tool only—or front and rear tools.
 b. Single Tooling Turret: the turret will be tooled with six or less tools and will have to complete six index movements before the collet or chuck can be opened. Only one workpiece is completed for a full turn of the turret.
 c. Multiple Tooling Turret: Two or more workpieces completed per complete turret turn. The turret may have two positions tooled three times the collet will open at the end of two indexes; or there may be three positions tooled twice and the collet opens at the end of each third index position.
(2) Bar Stock:
 a. Progressive Bar Feed—Multiple Tool or Single Tool Turret: A stop as 143, FIG. 1, could be set in each of the six positions and the front tool could form parts at preset positions with the collet opening at each position to feed stock. Example: groove or knurl with cross slide front tool while repeatedly advancing bar stock until part is to be cut off by rear tool; stop tools on the turret are progressively shorter.
 b. Multiple Tooling Turret: (as in (b) above)
 c. Single Tooling Form and Cut-off: Stock will be fed to engage bar stop tool as 143, FIG. 1, advanced by turret; turret backs off short distance to retract stop tool; part is formed and cut-off by cross slide tooling as in making studs or cylindrical blanks.
 d. Cut-off and Face New Bar End: This operation by the rear cross tool is to eliminate waste of material and assure the first piece made from a new bar will be acceptable.
 e. Typical sequence for one part per 360° turret index is: feed stock to stop; box tool, groove (cross slide front tool); center drill; drill for tap; tap; cut off (cross slide rear tool).
(3) Magazine Feed
 a. This mode is similar to bar feed mode except that the part is pushed into the collet by the first turret tool. The collet is closed and the desired sequence of operations is then performed. Both single tool and multiple tool can be used.

Peck feed and recess groove operations can be specified for any one of the six positions in the turret; multiple tooling sequence can also be used.

The cross slide can be called in during or after any turret operations. Software logic will prevent more than two cross slide operations in any cycle when not called for.

In the bar stock mode an "end of bar" limit switch will be employed; the machine will finish the piece it is working on and then stop. An LED (light emitting diode) error read out will indicate out of stock on the display panel.

A brief description will be given of some of the settings and data displays on the control panel 60, FIG. 1, principally for the purpose of recapitulating some of the machine functions and also to explain further the capacity of the machine. There is an upper row of indicator lamps bearing numerals one through six and also the letters F and R. These lamps show the tool position of the turret (six positions) and whether the front (F) or rear (R) cross slide tool is active.

In the row beneath, there are six rotatable dial knobs SS. These knobs set potentiometers for the spindle motor and thus can be turned individually to set the spindle speed for each turret tool position and for the front cross slide tool and the rear cross slide tool as well. The corresponding spindle speed is shown at RPM for each turret position and cross slide operation.

Any time there is an error in the set up, a diode lamp is displayed at ER, giving a code for the positional error.

The tool feed rate for each turret position and for the front and rear cross slide tool as well can be set in inches per minute in the row of potentiometer dial knobs IPM. At all times when the machine is in operation, the prevailing feed speed for the turret can be read digitally at TF.

The front tool on the cross slide can be selected for operation either during or after the cut has been made by the tool on the turret, or the cross slide tool may be "off". This three-way selection is made possible by a row of three-position knobs bracketed as DA (1-6).

If the machine is set up for use of the cross slide tooling only there is a similar three-position knob K for selecting the front cross slide tool or the rear cross slide tool or both. The speed or penetrating rate for cross slide feed in inches per minute is indicated digitally at CS.

The mode of operation, whether magazine, hand, bar, progressive bar or "selectable" can be selected by a five-position mode knob MD.

The number of tools being employed and whether it is single tooling, double tooling, pecking, swing recessing and so on is displayed alph-numerically at area A on the control panel; in the area above there are two indicating lights SA showing whether the machine is in set-up mode or automatic cycle mode.

Meters TCM and XCM respectively display the current drawn by the motors for the turret and cross slide. A rise in current may indicate a dull tool.

The left hand side of the control panel for the most part is concerned with manual set-up. The collet may be closed (CC) or opened (CO), by corresponding push buttons and a corresponding lamp is lighted at the same time. The turret may be in rapid approach (RA, lamp), the cross slide may be centered (CE, lamp), and the turret may be in home position, lamp TH.

During manual set-up, the spindle may be set by a knob to turn in reverse or forward (RF); the cross slide during manual set-up may be set up at either the rear or front tool, knob CR, and the turret may be set for moving forward or in reverse by a knob (TR); there is also an "off" position for each of these knobs during manual set-up for the spindle, the cross slide, and the turret.

Significantly enough, there is a knob ST which allows the turret or cross slide, whichever is in operation, to be stopped at any time during automatic operation so that any adjustment or off-set may be made.

There is a power-on switch button PW and an emergency stop switch button ES. An automatic bar cut-off knob switch BC is also presented on the control panel. It has an "off" position and also "reset" and "on" position for controlling the cross slide drive motor. By turning knob BC to "reset" and then to "on," the cross slide presents the rear tool (cut-off tool for bar stock mode) to cut off the end of a new bar, whereafter the cross slide returns to center position waiting for the operator to initiate (via knob AC) an automatic cycle for the bar stock mode.

The spindle motor may be set by a knob KM normally for left hand or right hand motion; or knob KM may be set to an "off" position in which case the machine cannot be started.

Coolant for cooling the tool may be supplied continuously, cyclically or not at all (off) by a three-positioned knob KL.

A jog knob JG may be in an off position (machine runs in the automatic mode) or at a "feed" position which means the machine will run automatically at the speeds and rates selected by the potentiometer settings. Knob JG may also be set for "single cycle" (one cycle and stop) or it may be set in a fourth position whereat the potentiometer settings are overridden with the turret and cross slides operating at a preset constant rate, say 50 inches per minute, which is of advantage in manual set-up.

When the machine is in the automatic (bar feed mode) the cross slide tooling cuts off the finished piece, the spindle stops, the collet opens, a new length of stock is fed, the collet closes and the spindle is restarted. This normal sequence may be overridden by a two-position selector switch SO so that the spindle motion will be continuous.

In the instance of square or hexagonal stock a collar rotating with the spindle may be provided with an actuator button opposed to a sensor switch to stop the spindle with the stock "right side up" for the commencement of the next cycle. This can be done when the spindle has slowed to say five or ten rpm as it approaches the complete stop condition.

The Compound Turret

Figure 16:
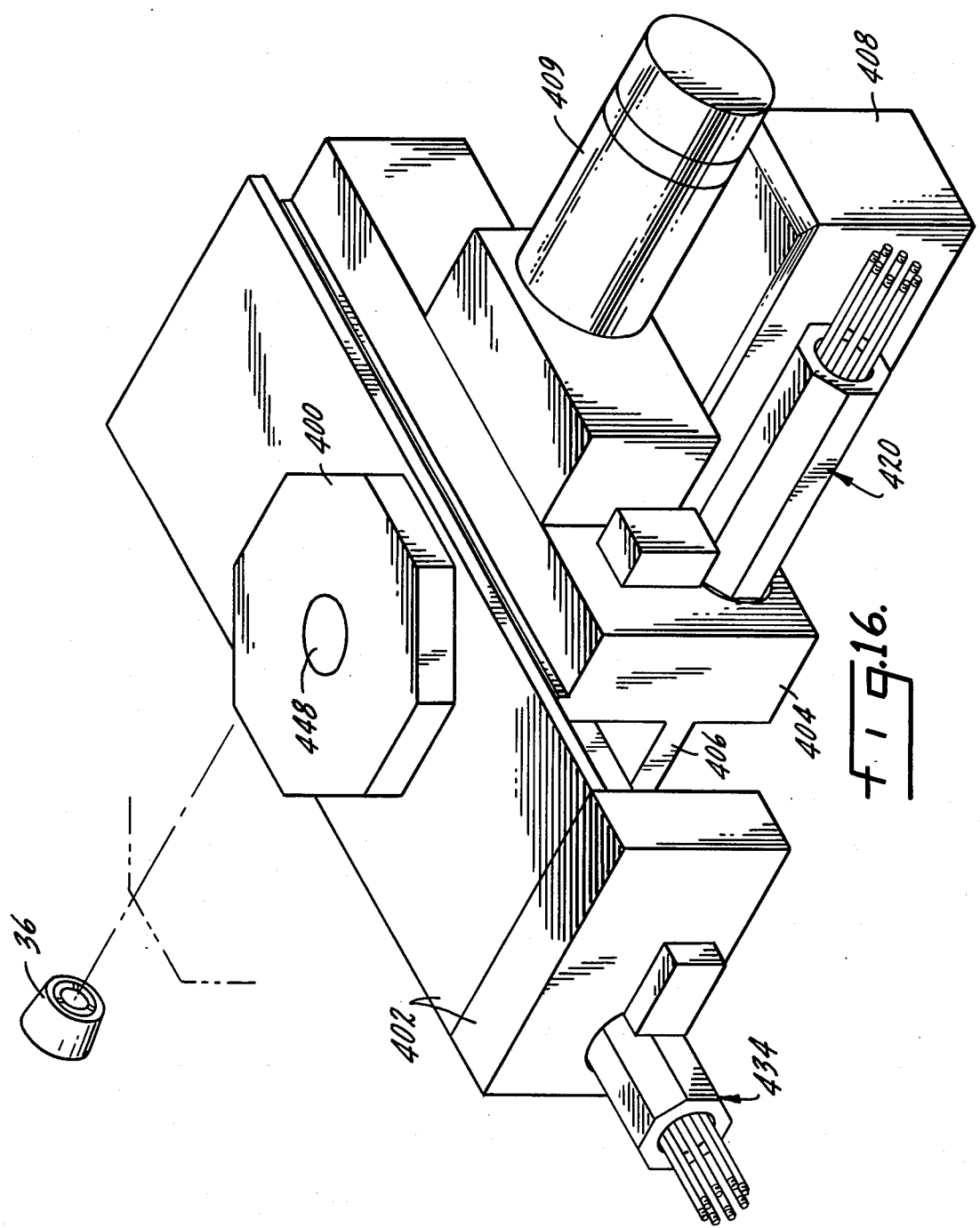
FIG. 16 is a perspective view of a compound turret having both an axial slide and a cross slide.

FIGS. 16, 17 and 18 are concerned with an eight-sided turret 400 which may undergo both axial and cross feed. Thus, the turret 400 can support eight tools any one of which may cut (penetrate) the workpiece during axial feed or cut the outside of the workpiece during lateral or cross feed. The cross tooling may involve external threading, turning, cross drilling and so on.

The turret 400 is mounted for lateral movement on a saddle 404 which is part of an axial slide 406. The axial slide 406 in turn is dove-tail mounted on an axial saddle 408 by which the entire turret assembly is guided for axial movement toward or away from the collet (chuck) 36.

Axial movement is derived from a reversible, variable speed D.C. motor 409. Cross movement is derived from a reversible, variable speed motor 410, FIG. 17.

Turret 400, as in the embodiment first described, may approach the workpiece at the rapid rate, feed forward at a slow rate while making the cut, withdraw from the workpiece at either the slow rate (tap) or rapid rate (drill) and finally return to home position at the rapid rate.

The cross slide 402 can traverse in or out at the rapid speed, and can be fed laterally at the slow rate, if required. The cross cut tool on the turret can make its cut at the commencement of the work cycle, before the axial tool makes its cut, or afterwards.

Thus, the pattern or track of tool movement can be a simple forward and reverse movement of the axial slide with no cross slide movement; or it can be a simple in and out movement of the cross slide 402.

The track may be L-shaped with the cross slide fed in at the commencement of the tool cycle, followed by axial feed as in external turning, and then return of both the axial slide and cross slide; or the cross slide tool may be moved in and out after the axial tool has made its cut.

The pattern may be box-shaped or rectangular.

The axial slide supports a ball nut assembly 411, FIG. 17, and the turret cross slide likewise supports a ball nut assembly 412 by which motion is imparted thereto by the respective gear trains and feed screws 414 and 416, driven by the respective drive motors as will be evident in FIG. 17. Speed is recorded by tachometers 408T and 410T.

A drum 420, FIGS. 16 and 17, is secured to the axial slide 406 for movement therewith. The drum 420 is like the drum 220, FIG. 8A, in having a sleeve 422 and a collar 424 in which indicia are to be selectively mounted. Sleeve 422 has eight sides. The section of sleeve 422 denoted by bracketed reference character 422A has a pair of tracks on each side for carrying indicia as 232 and 234, already described, for denoting the end of rapid advance (and the commencement of slow feed) and for denoting the sequence of events for internal tapping. Likewise, collar 424, like collar 222, is used to record the turret tool position. Since there are eight tool positions, four sensors 426A, 426B, 426C and 426D (and related indicia as 428A and 428C) are required under a binary code to indicate tool position.

The drum 420 carries eight selectively positionable stop screws 430 employed in the same manner as the stop screws 242, FIG. 8A, to induce reversing of the feed motor after the depth of cut has been achieved. The related fixed stop is identified by reference character 432, FIG. 17.

The cross slide also carries a sequencer and memory drum 434, equipped with selectively positionable stop screws 436 opposed to a fixed stop 438, functioning in the manner of drum 420.

It will be recognized that the axial slide has two motions (forward and reverse) and also the cross slide (in and out). The axial forward movement may be first or the first movement may be "cross slide in". The sequence of movement may vary considerably depending upon the nature of the work being done and time efficiency. To denote, and indeed to govern the pattern of axial and cross slide movement, drum 420 has a section 422B and drum 434 has a section 434B devoted to tool set-up in this regard. Each of these drum sections presents eight faces and referring to section 422B of the axial slide drum each face thereof is adapted to receive an indicium (metal stud) at either of two positions denoting the first and second operation of the turret, that is, whether the first step is movement of the axial slide or cross slide, and likewise for the second step. Lack of a stud (0=zero) denotes movement of the axial slide; the presence of a stud (X) denotes movement of the cross slide. The indicia positions are sensed by two sensors 440-1 and 440-2 and the output (either zero or plus for X) is used by the microprocessor to govern performance of the first and second steps. In this manner, two of the four possible motions are accounted for.

The other two motions (third step and fourth step) are governed by sensors 440-3 and 440-4 opposed to section 434B of the cross slide sequencer drum 434, where again there may be a stud (X) or none (0=zero) at each of two positions on the eight faces of the sequencer drum.

There will never be cross slide movement without axial movement because the turret has to be advanced in any event to position the cross slide tool at the side of the workpiece whether the cross slide work be turning, recessing, grooving or box-tooling.

On the other hand there will always be movement of the axial slide. Therefore, in those instances where the work involves only axial feed, the stop screws 436 on the cross slide drum 434 can be set to prevent movement of the cross slide as part of the set-up or there can be an over-ride switch on the control panel to simply cancel or nullify cross slide movement.

There is a third sensor 442 opposed to section 422B of the axial slide sequencer drum. This sensor is opposed to an indicium 444 (one on each face of the drum) and together they serve the purpose of the sensor-indicium combination 256-258, FIG. 8A, which ease the turret to home position.

The turret is supported for rotary indexing movement on an indexing shaft 448 turned by a pair of pinion gears 450,452.

The jack shaft 453 which supports gear 452 carries a bevel gear 454 meshed with a bevel gear 456 on a splined shaft 458 to which the cross slide drum 434 is keyed for indexing movement.

A second bevel gear 460 is carried by shaft 458, meshed with a bevel gear 462 at one end of a shaft 464. At the opposite end, shaft 464 carries a pinion gear 466 meshed with a pinion gear 468 on the axial slide drum 420.

In this manner the two sequencer drums 420 and 434 are synchronized to index with the turret accordingly as shaft 448 is indexed.

Indexing (45° turn) is achieved by an air-operated rack 472 which has its teeth meshed with a one-way pinion gear 474, supported beneath gear 450 loosely on shaft 448. Gear 450 on the other hand is keyed to shaft 448 as shown in FIG. 18.

Rack 472 is operated by the piston of an air cylinder (not shown) inside a housing 476, FIG. 17. Rack 472 when actuated advances toward a limit switch 478 and in doing so turns gear 474, in a manner to be described, clockwise as viewed in FIG. 17, indexing both drums 420 and 434 by 45°.

As shown in FIG. 18, rack 472 is meshed with gear 474 at all times. However, gear 474 is employed as a clutch to turn gear 450 and is normally displaced axially from (beneath) gear 450.

Gear 474 is provided with a clutch facing 474F by which gear 450 is turned when gear 474 is raised to engage the clutch facing with the underside of gear 450. Gear 474 is raised by raising shaft 448 and turret 400 a fraction of an inch in a manner now to be explained.

The cross slide 402 is provided with a sealed air chamber 480 surrounding shaft 448. A piston 482 is clamped to shaft 448 inside air chamber 480. Shaft 448 is free to slide in a pair of bearings 484 and 485 which in effect are supported by the cross slide. A spring means 486 normally exerts a strong downward bias on piston 482, normally maintaining the clutch disengaged, that is, gears 450 and 474 are normally disengaged.

When air under pressure is applied to operate rack 472, air under pressure is admitted to chamber 480 at the same time, lifting shaft 448 and the attached turret 400. Clutch facing 474F is thereupon clutched to gear 450 and gear 450 is turned with gear 474 until rack 472 strikes limit switch 478 resulting in the discontinuance of applied air, whereupon spring means 486 returns shaft 448 to the position shown in FIG. 18.

When the turret is lifted for indexing movement as thus described, its curvic coupling ring 488 (toothed coupling) is disengaged from a mating curvic coupling ring 490 fixed to the cross slide. When the turret drops, the curvic coupling rings re-engage to lock the turret in the indexed position.

When the end of rack 472 engages switch 478, indexing is complete, and the supply of air under pressure is reversed, reversing the rack, and at the same time air under pressure is admitted to the spring side of piston 482, FIG. 18, to return the turret and uncouple the clutch gear 474. Air under pressure may be used to replace the return action of spring 486 above described, or to aid the spring.

In FIG. 14 "slow feed in, slow feed out" for boring is designated by pulses from studs 232 and 234A, condition C for example. A similar set of studs may be used for the cross slide, that is, another stud may be added in FIG. 13 so that there may be "slow feed in, slow feed out" for cross slide boring.

The machine may also be equipped for vertical cut-off.

The arrangement of the sequencer studs shown in FIG. 14 may be advantageously modified, FIG. 19, located at the side of FIG. 14. Thus, each face of the multi-faced sequencer sleeve may be provided with a single track 224-3. The studs may be carried in slides 224-4 and 224-5, each selectively positionable in the track by means of lock screws 224-6. The condition shown in FIG. 19 is for the right hand tap (RHT) the ssme as condition A, FIG. 14.

FIG. 19 also shows the settings for:
Left Hand Tap—LHT
Right Hand Bore—RHB
Left Hand Bore—LHB
Right Hand Drill—RHD
Left Hand Drill—LHD Referring to FIG. 17, it will be recalled the sensors 426 A, B, C and D are employed to indicate turret tool position. These sensors may be positioned adjacent to the corresponding indicia on collar 424. However, the turret itself may carry the indicia as 428A, and 428C, be located on the underside of the turret (e.g. 428I, FIG. 18) and the related sensors in a fixed adjacent position, as at 426S.

It will be seen from the foregoing that the present manually settable machine may be brought into a microprocessor information loop without computer software normally requiring the efforts of a skilled programmer to define by computer language cutting tool paths, rates, speeds, tool selection and so on. Computer software requires additional administration, obviated by the present invention, nor will there be resistance by the tool maker or machinist who indeed can easily learn the manual set-up required under the present disclosure. He does not have to compete with a software programmer and indeed he brings his own mechanical skills into play.

We claim:
1. In an automatic turret lathe in which a turret having different faces each for supporting a tool is supported for rotary indexing movement on a reciprocal slide and in which the slide is supported for approach movement toward a workpiece, held by a reversible rotary spindle, and return movement to home position, the lathe including means to index the turret after the slide is in home position, the slide being reciprocated by a variable speed reversible motor adapted to advance the slide at rapid approach speed until the tool engages the workpiece, whereafter the slide is to be advanced at slow feed speed until the depth of cut is attained, and wherein the motor is reversed by a substantial rise in current:

an automatic sequencer unit attached to the slide to move axially therewith in both the tool approach and tool return direction, means to index the sequencer unit to different positions corresponding to the turret positions, said sequencer unit having at the different sequencer index positions a track for retaining variantly positionable metallic indicium settable manually therein to control the end of rapid approach and the commencement of slow feed;

proximity switch oscillator control sensors for sensing said indicium when indexed thereto, respectively to change the speed of said motor from rapid approach to slow feed;

said sequencer unit at each operable index position thereof including means supporting an extendible and retractable stop movable axially therewith and spaced from a fixed stop opposed thereto by a distance equal to the total distance of tool travel so that when the stops engage at the end of the slow feed travel there will be a consequent rise in motor current to reverse the motor and a safety switch between the stops to be actuated by the first-named stop and causing the motor to stop upon concurrent failure to sense positioning of the first-named indicium.

2. A lathe according to claim 1 having a multifaceted memory unit attached to the sequencer unit to move therewith, fixed code mounts on said memory unit for receiving encoding indicia to manually encode the memory unit to the tool index position, and a control panel on the lathe presenting a digital display which decodes said memory unit code.

3. An automatic turret lathe according to claim 1 including a cross slide equipped to support both a front tool and a back tool, a variable speed reversible motor for driving the cross slide in opposite directions both at a controlled rapid approach speed and a slow feed speed depending upon control, adjustable indicia carried by the cross slide and opposed to relatively fixed sensors which prescribe the end of rapid approach speed and the beginning of slow feed speed, an adjustable stop on the cross slide and a fixed stop opposed thereto which on engagement limits the depth of cross slide cut in each direction and upon engagement results in a rise in current to the cross slide motor whereby the motor is reversed.

4. A turret lathe according to claim 3 having a safety switch between the cross slide stops and located in the path of the cross slide adjustable stop to be actuated during rapid approach thereby causing the cross slide motor to stop when in the same machine cycle there is failure to sense an indicium controlling the end of rapid approach speed and the beginning of slow feed speed.

5. In an automatic turret lathe in which a turret slide is indexable from one position to another and in which the turret slide is normally advanced and retracted rapidly and at feed speeds, relative to a workpiece rotated by a spindle, by a reversible variable speed motor turret indexing means; a sequencer which indexes with the turret, said sequencer being equipped with manually settable indicia:

(a) slow feed of the turret slide after the tool is presented to the workpiece regardless of the kind of tool;

(b) slow withdrawal of the turret slide when tapping or boring; and (c) reverse spindle motion after or before completing a tap depending on whether the tap is right hand or left hand;

proximity switch oscillator control sensors for sensing said indicium when indexed thereto;

said lathe for each tool position having on the turret slide a manually adjustable stop screw indexible with said turret and opposed to a fixed stop to determine the depth of cut when drilling or boring and a switch between the stops to be actuated by the advancing adjustable screw to stop the motor upon failure of the related proximity switch sensor to sense an indicium corresponding to (a) for the corresponding tool position.

6. A lathe according to claim 5 having a cross slide for supporting a cross slide tool, a second reversible variable speed motor for driving the cross slide in opposed directions first at a rapid approach speed and then at a slower feed speed to present the cross slide tool to the workpiece, an indicium denoting home position for the cross slide, another indicium denoting the position of the cross slide where rapid approach is to end and slow feed to begin, and a sensor for said other indicium.

7. A turret lathe according to claim 5 having a memory unit which indexes with the turret, and fixed code mounts on said memory unit for receiving encoding indicia to manually encode the memory unit to the turret index position, and a control panel on the lathe presenting a digital display which decodes said memory unit code.

8. A turret lathe according to claim 5 wherein the turret is rotatably supported for indexing movement to one of several tool positions on a head portion of the turret slide, the turret being carried by a shaft supported by a bearing inside said head on an axis titled from the vertical, said bearing comprising a pair of sloped bearing races respectively on said head and said shaft and capturing therebetween a set of tapered roller bearings, means for manually clamping the turret to said shaft with a progressive force in compression applied along said axis thereby to apply a pre-load to said bearing, and a thrust bearing interposed between the opposing surfaces of the turret and head.

9. A turret lathe according to claim 5 or 8 in which the spindle is driven by a spindle motor, an air operated clutch interposed between the spindle and spindle motor, said clutch comprising:

a clutch shaft driven by the spindle motor and said clutch shaft suporting a pair of drive pulleys having different diameters;

a pair of pressure plates rotatable with the clutch shaft, each pressure plate being spring biased away from engagement with a related pulley;

an air chamber behind each pressure plate for receiving air under pressure to actuate the related pressure plate to engage the related pulley;

a pair of air ports supported outboard of the clutch shaft, and related air passages respectively assigned to said ports and chambers whereby air under pressure may be selectively communicated to one of said air ports to actuate the corresponding pressure plate.

* * * * *